United States Patent
Koenig et al.

(10) Patent No.: US 10,968,056 B2
(45) Date of Patent: Apr. 6, 2021

(54) HANDLING DEVICE FOR PRODUCT STACKS

(71) Applicant: Maschinenbau Oppenweiler Binder GmbH & Co. KG, Oppenweiler (DE)

(72) Inventors: Sebastian Koenig, Murrhardt (DE); Olaf Haug, Berglen (DE); Jochen Krawtschuk, Murrhardt (DE)

(73) Assignee: MBO POSTPRESS SOLUTIONS GMBH, Oppenweiler (DE)

( * ) Notice: Subject to any disclaimer, the term of this patent is extended or adjusted under 35 U.S.C. 154(b) by 0 days.

(21) Appl. No.: 16/858,106

(22) Filed: Apr. 24, 2020

(65) Prior Publication Data

US 2020/0354167 A1    Nov. 12, 2020

(30) Foreign Application Priority Data

May 7, 2019    (EP) ...................... 19000221

(51) Int. Cl.
*B65G 61/00* (2006.01)
*B65H 45/04* (2006.01)
*B25J 15/00* (2006.01)

(52) U.S. Cl.
CPC .......... *B65G 61/00* (2013.01); *B25J 15/0028* (2013.01); *B65H 45/04* (2013.01)

(58) Field of Classification Search
CPC .. B65H 2301/4224; B65H 2301/42256; B65H 45/04; B25J 15/0253; B65G 61/00
See application file for complete search history.

(56) References Cited

U.S. PATENT DOCUMENTS

| | | | |
|---|---|---|---|
| 6,129,504 A | 10/2000 | Gämmerler | |
| 6,354,793 B1 | 3/2002 | Gämmerler | |
| 6,412,253 B1 * | 7/2002 | Meyer | B65H 31/30 |
| | | | 294/103.1 |
| 2004/0240979 A1 | 12/2004 | Beavers | |
| 2019/0126493 A1 * | 5/2019 | Jonas | B25J 15/08 |

FOREIGN PATENT DOCUMENTS

| | | |
|---|---|---|
| DE | 19626802 A1 | 1/1998 |
| IT | LU20080017 A1 | 4/2010 |

\* cited by examiner

*Primary Examiner* — Gerald McClain
(74) *Attorney, Agent, or Firm* — Lucas & Mercanti, LLP

(57) ABSTRACT

A handling device comprises a gripping unit which is movable in three dimensions and which is specified for receiving the stack of products disposed in a receiving region, for moving the stack, and for depositing the stack in a depositing region. The gripping unit comprises at least one upper holding element for holding down an upper side of the received stack, and at least one lower holding element for supporting a lower side, opposite the upper side, of the received stack.

18 Claims, 7 Drawing Sheets

HANDLING DEVICE FOR PRODUCT STACKS

FIELD OF THE INVENTION

The present invention relates to a handling device for transferring a stack of products, in particular of folded, stapled, stitched or bound products, to a folding machine having such a handling device, as well as to a method for transferring stacks of products.

In many machines for producing packaging products, the products at an exit of the machine are provided in the form of a stack in a delivery region of the machine, a plurality of the products lying on top of one another in said stack so as to simplify the subsequent handling, storing, and transporting of the products. In a folding machine, for example, planar media such as, for example, paper sheets, are folded to folded products by means of one or a plurality of folding units. The folded products are subsequently typically stacked so as to form stacks of folded products by means of a stacking device. At the exit of a folding machine, a stack of folded products is therefore usually disposed in the delivery region.

An operator of the machine then manually lifts this stack of products from the delivery region onto a transport medium such as, for example, a pallet and thereon disposes a multiplicity of successive stacks beside one another. Conversely, at a destination the stacks have again to be lifted down from the transport medium for further handling.

The procedure of lifting and disposing the stacks of products is very time-consuming and strenuous for the operator. This activity is very stressing for the operator above all in the case of products such as, for example, folded, stapled, stitched or bound products which are to be treated with care and are thus not easy to handle.

SUMMARY OF THE INVENTION

It is therefore an object of the present invention to provide a handling device as well as a method for transferring a stack of products from a receiving region to a depositing region by means of which handling device and method the transfer of the stacks is possible in a simple, efficient and reliable manner.

According to an aspect of the invention, a handling device for transferring a stack of products from a receiving region to a depositing region comprises a gripping unit which is movable in three dimensions and is specified for receiving a stack of products disposed in the receiving region, for moving the stack, and for depositing the stack in the depositing region. The gripping unit comprises at least one upper holding element for holding down an upper side of the received stack, and at least one lower holding element for supporting a lower side, opposite the upper side, of the received stack.

A handling device which takes care of the transfer of stacks of products from the receiving region to the depositing region in a simple, efficient and reliable manner is provided in this way. The handling device herein is actuated and driven in such a manner that the handling device moves the stack to be moved from a receiving position in the receiving region to a predefined depositing position in the depositing region. The procedure of the transfer is at least partially automated on account thereof, and an operator or worker is relieved in terms of time as well as physical effort. Since the upper holding element holds down the upper side of the received stack, and the lower holding element supports the lower side of the stack, the gripping unit reliably receives the stack, and tilting of the stack or a displacement of the products of the stack relative to one another while receiving, transferring, and depositing is avoided. Folded, stapled or bound products which are to be treated with care are therefore transferred in a reliable manner.

By virtue of the stack being gripped by the upper and the lower holding element, the handling device is particularly suitable for such products which have a low inherent weight, on account of which the stack of products has less cohesion than is the case with a stack of comparatively heavy products, for example. Products which are flexible and are therefore easily deformed when exerting pressure can also be transferred in a simple and reliable manner. The products are therefore particularly preferably folded, stapled, stitched or bound products such as, for example, spine-stitched products or adhesively bound products. It is understood that the handling device may however also be used for all other products which can be stacked in a suitable manner.

The receiving region is preferably the delivery region of a machine such as, for example, a folding machine or a printing machine, or of a stacking device which forms stacks of products. The receiving region may however also be a transport medium on which the stacks of products are transported or stored.

The depositing region is the region to which the stacks are to be moved. A transport medium such as, for example, a pallet on which the stack of products as well as subsequent stacks of products are deposited is preferably disposed in the depositing region. The depositing region can however also be configured at the entry of a conveyor device or be a region in which the stack is fed to further processing either in a manual or mechanized manner.

The gripping device is movable in three dimensions, preferably in the x-direction, the y-direction and the z-direction of a Cartesian coordinate system in the x-direction, the y-direction, and the z-direction. It is achieved on account thereof that the gripping device can dispose a stack received in the receiving region in various mutually offset depositing positions in the depositing region, on the one hand, as well as overcome obstacles or height differentials between the receiving region and the depositing region. The movement of the gripping unit herein can take place in a linear manner or by superimposing movements on motion paths of arbitrary curvature. To this end, the gripping unit is correspondingly mounted on the handling device which in turn is correspondingly actuated and driven.

It is understood that any other suitable coordinate system can be used for defining the movement of the handling device and the gripping unit, or for controlling and driving the latter, respectively.

The gripping unit is preferably movable in a translatory and rotary manner. The gripping unit herein can be established on the handling device such that no relative movement is possible between the gripping unit and the component of the handling device to which the gripping unit is attached. The gripping unit can however also be movable in a translatory and/or rotary manner relative to the handling device. The gripping unit can in particular be mounted on the handling device so as to be rotatable about at least one axis relative to the component of the handling device to which said gripping unit is attached.

The gripping unit can in each case comprise a single upper holding element and a single lower holding element so as to enable a simple and thus cost-effective construction of the gripping unit. The gripping unit can however also comprise a plurality of upper holding elements and/or a plurality of lower holding elements. All explanations hereunder thus apply in analogous manner also to embodiments in which the gripping unit comprises a plurality of upper and/or lower holding elements.

In order to guarantee even more reliable receiving of the stack of products by the gripping unit, the lower holding element in one position defines a support plane for bearing the stack. A stack to be moved is disposed on said support plane of the gripping unit such that the products of the stack are disposed so as to be substantially parallel to said support plane and aligned so as to be planar. The handling device during receiving, transferring, and depositing the respective stack is preferably actuated and driven in such a manner that the support plane is aligned so as to be substantially horizontal. Tilting of the stack, or sliding of the products of the stack, is avoided on account thereof.

If only a single lower holding element is provided, said single holding element comprises a planar support face for defining the support plane. The support face comes into contact with the lower side of the stack to be moved. The lower holding element can however also have a plurality of contact locations lying in one plane.

If a plurality of lower holding elements are provided, the holding elements of the plurality of lower holding elements can in each case comprise one support face, said support faces being disposed in a common plane so as to define the support plane. The holding elements of the plurality of lower holding elements can however also have in each case another shape which is suitable for defining the support plane. For example, two lower holding elements can be configured so as to be substantially cylindrical and in each case be in linear contact with the lower side of the stack, wherein the contact locations lie in one plane and define the support plane. Three or more lower holding elements can also have only one contact point with the lower side of the stack so as to define the support plane. The holding elements of the plurality of lower holding elements can all have the same shape or be of different configurations.

The rigidity of the products, or of the stack of products, respectively, is to be considered in the basic design of the lower holding elements such that said products are reliably received and do not fall from the lower holding element, or fall down between a plurality of lower holding elements, respectively, by virtue of the flexing of the said products. Independently of the exact configuration of the holding elements, it is therefore preferable for at least two or four lower holding elements to be provided which are preferably disposed at least in the region of two mutually opposite lateral peripheries of the lower side of the stack to be moved.

In order for the upper side of the received stack to be held down in an ideally reliable manner, it is preferable for the upper element to define a contact plane for contacting the upper side of the stack.

If only a single upper holding element is provided, this upper holding element correspondingly has a contact face for defining the contact plane. Alternatively, the holding elements of a plurality of upper holding elements can in each case also have other contact geometries such as, for example, a linear contact or punctiform contact with the upper side of the stack so as to define a contact plane as has been described above in the context of the plurality of lower holding elements.

The contact plane is preferably aligned so as to be parallel to the support plane. It is ensured on account thereof that a stack of products during transferring maintains a substantially square shape. Independently of the exact configuration of the upper holding element, it is preferable here too for at least two or four upper holding elements to be disposed in the region of at least two mutually opposite lateral peripheries of the upper side of the stack of products, so as to guarantee that the upper side is held down in a reliable manner.

In one preferred embodiment the upper and the lower holding element are movable relative to one another. On account thereof, the upper and the lower holding element are at the same time movable relative to the stack to be received and to be moved. This offers the advantage that the upper and the lower holding element can initially be disposed so as to be spaced apart from the stack and to be moved in the direction of the stack only when the latter is disposed between the upper and the lower holding element. The receiving of the stack is facilitated on account thereof. Moreover, the spacing between the upper and the lower holding element can be readily adapted to different stack heights.

The relative movement between the upper and the lower holding element preferably comprises a component of movement in the direction of the stack, or perpendicular to the support plane, respectively, and thus perpendicular to the upper side or the lower side, respectively, of the stack to be received. The upper and the lower holding element can then be moved relative to one another in the direction of the stack so as to reduce the spacing from the stack. The upper and the lower holding element are preferably movable relative to the stack so far until the upper holding element bears on the upper side of the stack and the lower holding element bears on the lower side of the stack. A relative movement between the holding elements can then ensure that air is squeezed out of the stack and the products of the stack on account thereof are disposed in a substantially planar form, in so far as the products are sufficiently flexible as in the case of, for example, folded, stapled/stitched or bound products.

The upper holding element as well as the lower holding element can be movable in the direction of the respective other holding element, or in the direction of the stack, respectively. However, only the upper holding element or else only the lower holding element may also be movable.

Each movable holding element can be moved directly by means of a drive, or by way of a corresponding mechanism be moved indirectly by means of a common drive.

Each movable holding element by means of suitable preloading elements (for example springs) can be preloaded to a predetermined position or be mounted so as to be freely displaceable in a guide of the gripping unit. For example, the upper holding element in a guide is freely displaceable perpendicularly to the support plane. The force of the weight of the upper holding element herein alone can cause a displacement of the holding element in the direction of the stack. The upper holding element by means of a tension spring or compression spring could potentially also be preloaded in the direction of the upper side of the stack. The lower holding element is preferably drivable and can be displaced or pivoted relative to the upper holding element.

In one preferred embodiment the gripping unit furthermore comprises a first lateral delimitation element and the second lateral delimitation element which are in each case assignable to one of two mutually opposite lateral faces of the stack to be received. The lateral faces of the stack extend so as to be perpendicular to the lower side of the stack.

The first and the second delimitation element serve for laterally delimiting a receiving region for the stack in the gripping unit. The first and the second delimitation element are particularly suitable for receiving and storing the upper and the lower holding element. Alternatively or additionally, the first and the second lateral limitation element can also support the respective lateral face of the stack to which said lateral delimitation elements are assigned. An even safer and more dimensionally stable transfer of the stack of products is guaranteed on account thereof.

One first and one second lateral delimitation element can in each case be provided. Optionally, a plurality of first and/or a plurality of second delimitation elements can be provided. The explanations hereunder can therefore be applied in an analogous manner to embodiments having an arbitrary number of first and second delimitation elements.

In order to achieve an optimal alignment of the stack, the first delimitation element preferably defines a first delimitation plane and the second delimitation element preferably defines a second delimitation plane for bearing on in each case one of two mutually opposite lateral faces of the stack to be received. The first and the second delimitation plane are aligned so as to be mutually parallel and so as to be in each case perpendicular to the support plane.

If the gripping unit comprises in each case only one first and one second delimitation element, said delimitation elements preferably comprise in each case one delimitation face or a plurality of contact locations for defining the delimitation planes. Delimitation elements of a plurality of delimitation elements can also have another contact geometry (for example a linear contact or a contact point) toward the lateral faces of the stack to be received so as to define a delimitation plane which is described at the outset in the context of the lower holding element and the support plane.

Simple receiving of a stack by means of the gripping unit is achieved when the first and the second delimitation element according to one particularly preferable embodiment are movable relative to one another. The first and the second delimitation element can in particular be movable toward one another. The relative movement of the first and of the second delimitation element therefore comprises a component of movement which is aligned so as to be parallel to the support plane, or perpendicular to the delimitation planes and the mutually opposite lateral faces of the stack to which the delimitation elements are in each case assignable, respectively. On account thereof, the stack of products can be disposed between the first and the second delimitation element as well as between the upper and the lower holding element, wherein the first and the second delimitation element meanwhile have a specific spacing from the respective lateral face of the stack on account of which a collision between the gripping unit and the stack is prevented. The first and the second delimitation element are only subsequently actuated in the direction of the two mutually opposite lateral faces of the stack, preferably until said delimitation elements touch the respective lateral face to which they are assigned.

The first and the second delimitation element are preferably driven directly by means of a respective dedicated drive, or driven indirectly by means of a common drive and a suitable mechanism.

The relative movement between the first and the second delimitation element can be converted in a particularly simple manner when the gripping unit according to one preferred embodiment comprises a support and at least one of the first and the second delimitation element is mounted so as to be linearly displaceable on the support. It is understood that one of the two delimitation elements can be configured so as to be stationary and only the respective other delimitation element can be linearly displaceable. Alternatively, the first and the second delimitation element can be mounted so as to be linearly displaceable on the support, wherein the movement of the delimitation elements preferably takes place in a synchronous manner.

For example, the support can have at least one corresponding linear guide in which a corresponding counter piece on the at least one linearly displaceable delimitation element engages. The linear movement of the linearly displaceable delimitation element can take place by suitable drives such as, for example, a linear drive, a spindle drive, or a hydraulic or pneumatic drive, for example by means of suitable cylinders. However, a corresponding mechanism for moving the first and the second delimitation element relative to one another can also be provided as is derived in particular from the description of the figures hereunder.

It is particularly preferable for the upper and the lower holding element to be mounted on, or attached to, respectively, the first and/or the second delimitation element. A simple construction of the gripping unit having a low number of components results on account thereof. If only one upper holding element, or one lower holding element, respectively, is in each case provided, said holding element can in each case be mounted on the first or on the second delimitation element, or can extend from the first limitation element to the second delimitation element and be mounted on both delimitation elements. If a plurality of upper or lower, respectively, holding elements are provided, it is preferable for part of the plurality of upper or lower holding elements, respectively, to be mounted on the first delimitation element and the respective other part of the plurality of upper or lower, respectively, holding elements to be mounted on the second limitation element. The holding elements of the plurality of upper or lower, respectively, holding elements can in this instance be disposed so as to be symmetrical to a central plane which is defined so as to be perpendicular to the support plane between the first and the second delimitation element. Alternatively, the respective holding elements can also be disposed so as to be asymmetrical to said central plane.

If the upper and the lower holding element are movable relative to one another, it is furthermore preferable for at least the movable holding element to be mounted so as to be linearly displaceable along at least one of the first and the second delimitation element. To this end, the at least one of the first and the second delimitation element can comprise a guide which interacts with a corresponding counter piece on the respective holding element such that the holding element is displaceable along the guide. A longitudinal direction of the guide is preferably configured so as to be perpendicular to the support plane so as to enable a linear displacement capability of the holding element in the direction of the stack.

The guides for the upper and the lower holding element can also be configured as a common guide if the upper as well as the lower holding element are mounted so as to be linearly displaceable on the first and/or the second delimitation element. However, the at least one guide of the lower holding element may also be a guide other than the at least one guide of the upper holding element.

The lower holding element can also be mounted so as to be pivotable in relation to at least one of the first and the second delimitation element. To this end, a rotary joint which defines a rotation axis about which the lower holding element is pivotable is provided between the lower holding element and the respective delimitation element.

In one embodiment the lower holding element can be mounted so as to be linearly displaceable along at least one of the first and the second delimitation element as well as be mounted so as to be pivotable in relation to said delimitation element. To this end, the lower delimitation element is preferably configured in multiple parts, wherein the individual portions are connected to one another in an articulated manner. A lower holding element which in a particularly stable manner defines a support plane and at the same time is movable in a simple manner and disposable in a place-saving manner is provided on account thereof. Moreover, this mechanism guarantees that the stack is smoothly lowered in the depositing region.

In one particularly preferred embodiment the handling device furthermore comprises a robot, in particular a gantry robot or an articulated-arm robot. The gripping unit can in this way be moved in a particularly simple and diverse manner in three dimensions, on account of which the depositing of stacks of products is possible in a multiplicity of different depositing positions in the depositing region as well as in a plurality of different mutual alignments.

The robot preferably comprises a robotic arm having a free end, wherein the gripping unit is disposed on the free end of the robotic arm. The gripping unit herein can be rigidly connected to the robotic arm. However, the gripping unit is preferably connected to the robotic arm in an articulated manner and is rotatable relative to the robotic arm about at least one rotation axis which extends so as to be perpendicular to the upper side and to the lower side of a received stack, or to the support plane, respectively. Other articulated connections which enable arbitrary pivoting of the gripping unit relative to the robotic arm can also be provided.

The robot is preferably configured as a collaborative robot so that an optimal collaboration between an operator and the robot is possible and additional protective devices such as, for example, screens about the robot, which would restrict the operating range of the operator are not required. At the same time, the safety of the operator who is present in the environment of the robot is nevertheless ensured.

A control installation for controlling the robot is preferably provided. The control installation can have an operator interface for inputting control commands by the operator. The control installation of the robot can furthermore be coupled to the control installation of the machine, or be integrated in the latter, so as to enable optimal tuning between the robot and the machine.

The robot can furthermore be remote-controlled by the operator, or assume the task of transferring a stack of products in a partially automatic or fully automatic (autonomous) manner. To this end, the robot, or the handling device, respectively, is correspondingly specified and actuated by the control installation.

The handling device can be particularly advantageously utilized conjointly with a folding machine, wherein the stacked products are folded products. A folding machine according to the present invention therefore comprises in succession along a processing direction at least one folding unit for folding planar media so as to form folded products; a stacking device for forming a stack of folded products from the folded products; a delivery region for delivering the stack of folded products which forms a receiving region; a depositing region assigned to the folding machine; as well as the handling device for transferring the stack from the delivery region to the depositing region assigned to the folding machine.

The advantages of the handling device described above can in this way be directly implemented on the folding machine and be a benefit to the operator of the folding machine.

The folding machine in the processing direction ahead of the at least one folding unit furthermore preferably comprises an infeed. The infeed can be formed by a docking unit, for example a pallet docking unit. However, the infeed can also take place directly from a machine upstream of the folding machine, such as for example a printing machine.

A method for transferring stacks of products, in particular of folded, stapled, stitched or bound products, from a receiving region to a depositing region, comprises the following steps:
a) disposing a stack of products and a gripping unit relative to one another in a receiving region, wherein the stack is formed by a plurality of products lying on top of one another, of which the lowermost product preferably bears in a planar manner in the receiving region;
b) receiving the stack disposed in the receiving region by means of the gripping unit;
c) moving the stack from the receiving region to the depositing region by means of the gripping unit;
d) depositing the moved stack in the depositing region;
e) repeating steps a) to d) for at least one further stack.

A method which facilitates the transfer of stacks of products from a receiving region to a depositing region, is designed in an efficient and reliable manner, and relives an operator of the machine is provided in this way.

The method is preferably carried out by means of the handling device described above. Accordingly, all features, properties and advantages of the handling device can be applied to the method.

The stack of products in the receiving region is formed in such a manner that the products lie so as to be parallel to a plane which is defined by a bearing face of the receiving region. The products lie on top of one another in such a manner that only the lowermost product of the stack bears in the receiving region. The products lie on top of one another in a substantially planar manner. Deviations may result from the bulging of the products. If the products are preferably configured as folded, stapled/stitched or bound products, the spines of said products form a lateral face of the stack which is disposed so as to be substantially perpendicular to the lower side of the stack. A deflection of the product prior to the stacking such that said products stand upright is not necessary in this case. Moreover, the stack of products thus formed has a certain stability so as in an ideally independent manner to stand without tilting.

A transport medium such as, for example a pallet, on which the stack of products as well as subsequent stacks of products can be deposited is preferably disposed in the depositing region. The depositing region can however also be configured at the entry of a conveyor device or be a region in which the stack is fed for further processing either in a manual or mechanized manner.

The successive stacks of products are deposited in a predetermined pattern in the depositing region in that the stacks are disposed so as to be mutually offset in one plane.

If the products are configured as folded, stapled/stitched or bound products, it is preferable for two stacks according to the predetermined pattern to lie opposite one another in the depositing region in such a manner that the lateral faces of both stacks formed by the spines of the products face away from one another. This means that the lateral faces of both stacks which are opposite the spines face one another. Further stacks can also be disposed in such a manner that the lateral face of the respective stack that is opposite the spines faces a further stack.

This disposal leads to no product being able to be fall from the depositing region, or from a transport medium, if present, respectively, even when a stack of products disposed there tilts over. The reason therefore lies in that the stacks by virtue of a build-up of the spines of the products in the region of the spines of the products have a greater thickness than on the opposite side. The spine build-up can also be created by, for example, inherent restoring forces in the product and by the material accumulation in the region of a fold or by spirals or adhesive of stapled/stitched or bound products. Stacks in which the products lie on top of one another therefore have a greater height on the lateral side formed by the spines than on the opposite lateral face. An inclination of the products which from the lateral face formed by the spines drops in the direction of the opposite lateral face and increases with the increasing number of products results on account thereof. There is therefore the risk that products at the top slide from the stack in the direction of the lateral face that is opposite the spines. If at least one further stack is disposed there, the sliding products are stopped and it is avoided that said products fall from the depositing region and potentially from the transport medium.

Independently of the disposal of the stacks in a specific pattern and of whether a transport medium is disposed in the depositing region, successive stacks of products in the depositing region are disposed so as to be mutually spaced apart. If a predetermined number of stacks of products are disposed in the depositing region, said number of products form a first layer of stacks and it is conceivable for a second layer of stacks to be deposited onto said first layer of stacks. A separation element may be provided between the layers of stacks.

Step a) of disposing the stack and the gripping unit preferably takes place in such a manner that two mutually facing lateral faces of the stack are disposed between a first and a second lateral delimitation element of the gripping unit and an upper side and a lower side of the stack are disposed between an upper holding element and a lower holding element of the gripping unit.

Meanwhile the stack is preferably disposed so as to be stationary in the depositing region of the machine. Accordingly, the gripping unit is positioned relative to the stack. In order for simple positioning of the gripping unit to be enabled, the first and the second delimitation element during the disposal of the gripping unit have a specific spacing from the two opposite lateral faces of the stack in order to avoid any collision with the stack.

The upper and the lower holding element also preferably have a specific spacing from the upper side and the lower side, respectively, of the stack in order to avoid any collision with the stack. The upper side and the lower side of the stack being disposed between the upper and the lower holding element means that the upper holding element is situated above a plane defined by the upper side of the stack, and the lower holding element is situated below a plane defined by the lower side of the stack. By virtue of the spacing of the delimitation element from the lateral faces during step a) it may be that the upper holding element is not situated directly above the upper side of the stack but also so as to be laterally offset to the upper stack, and that the lower holding element is not situated directly below the lower side of the stack but also so as to be laterally offset to the lower side of the stack. Should the stack not be substantially cuboid and the upper side or the lower side be disposed so as to be oblique in relation to a horizontal plane, this observation is limited to the relatively close environment of the stack in which the gripping unit and the holding elements are disposed.

It is preferable for the lower holding element during step a) to be at least temporarily in a position in which said lower holding element does not protrude substantially into an intermediate space between the first and the second lateral delimitation element. The disposal of the gripping unit relative to the stack is simplified on account thereof, since no collision between the lower holding element and the stack is to be expected.

Step b) of the method then preferably comprises the moving of the lower holding element from the first position to a second position in which the lower holding element protrudes into the intermediate space between the first and the second lateral delimitation element and delimits the intermediate space in a downward manner so as to form a receptacle for the stack. The lower holding element in the second position defines the support plane for the stack. The moving of the lower holding element from the first position to the second position can comprise a linear movement, a rotary movement, or a combination thereof.

The moving of the lower holding element to the second position can take place as soon as the lower holding element is disposed below the plane defined by the lower side of the stack. The delimitation elements can then be reliably disposed from above so as to be beside the lateral faces of the stack without risking a collision between the lower holding element and the stack.

It is understood that the lower holding element can however also be disposed permanently in the second position, wherein corresponding attention is required when positioning the gripping unit relative to the stack. The disposing of the gripping unit according to step a) takes place, for example, in such a manner that the first and the second delimitation element have a relatively large spacing from the respective lateral face of the stack, said spacing being sufficient for avoiding any collision between the lower holding element and the stack. However, the gripping unit can also be first disposed in such a manner that the lower holding element is situated below the plane defined by the lower side of the stack, and a movement in the direction of the stack takes place only subsequently in a direction perpendicular to a lateral face of the stack, said lateral face being aligned so as to be perpendicular to those two mutually opposite lateral faces of the stack to which the delimitation elements are assigned.

According to one preferred embodiment of the method, step d) of depositing the moved stacks furthermore comprises:
   moving the lower holding element from the second position to the first position and, on account thereof, releasing the stack in a downward manner;
   entraining the upper holding element by way of the upper side of the stack during the depositing until the lower side of the stack bears in the depositing region.

It is guaranteed on account thereof that the upper holding element holds down the uppermost product until the stack has been deposited, on account of which slipping of the products of the stack is prevented during the depositing. This is particularly advantageous when the lower side of the stack, caused by the device, does not yet bear in the depositing region immediately prior to moving the lower holding element from the second position to the first position and the stack slips downward once the stack has been released.

It is typically desirable for a transport medium such as, for example a pallet, to be provided in the depositing region. Transport media usually have a standardized shape which is not adapted to the construction of the gripping unit. It will therefore often not be possible for the stacks of products by means of the gripping unit to be deposited in the depositing region in such a manner that the lower side of the stack already bears in the depositing region while the lower holding element is still disposed below the lower side of the stack. It is therefore preferable for the lower holding element to move from the second to the first position and on account thereof to release the stack, and for the stack to slide downward over the remaining distance to the bearing face in the depositing region. The stack herein is preferably guided by the first and the second lateral delimitation element and the upper holding element is entrained so as to guarantee the cohesion of the stack.

Step b) of receiving the stack of products finally preferably furthermore comprises:

b1) moving at least one of the first and the second delimitation element in the direction of a lateral face of the stack that faces said delimitation element; and b2) preferably moving at least one of the upper and the lower holding element relative to an upper side or lower side of the stack that faces said holding element and that extend so as to be perpendicular to the lateral faces of the stack.

It is preferable herein for the gripping unit during step a) to be disposed in such a manner that the upper holding element, the lower holding element, the first delimitation element, and the second delimitation element are in each case disposed so as to be spaced apart from the stack, and for the first and the second delimitation element subsequently to be moved in the direction of the stack, preferably until said delimitation elements touch the mutually opposite lateral faces to which the delimitation elements are assigned. The upper and the lower holding element can subsequently be moved relative to the stack. To this end, it can suffice that the lower holding element moves to the second position or is already situated in the second position, and the gripping unit is moved upward until the lower holding element touches the lower side of the stack.

According to one particularly preferred embodiment the gripping unit is initially disposed in such a manner that two mutually opposite lateral faces of the stack of products are disposed between the first and the second lateral delimitation element of the gripping unit but so as to be spaced apart from said lateral delimitation elements, and for an upper side and a lower side of the stack to be disposed between the upper holding element and the lower holding element of the gripping unit so as to be spaced apart from said holding elements, wherein the lower holding element is situated in the first position. The first and the second delimitation element are subsequently moved in the direction of the opposite lateral faces of the stack until the first and the second delimitation element bear on the respective lateral face. The lower holding element, before, during, or after moving the first and the second delimitation element, is moved to the second position. The gripping unit is subsequently moved at least so far in a manner perpendicular to the lower side of the stack and thus perpendicular to the support plane in an upward manner until the stack by way of the lower side thereof bears on the lower holding element.

The upper holding element is moved downward relative to the stack until said upper holding element bears on the upper side of the stack. For example, the upper holding element by virtue of the force of the weight thereof can slip downward such that said upper holding element bears on the upper side of the stack. However, the upper holding element can also be disposed so as to be stationary, wherein in this instance a minor spacing, for example of a few millimeters, is typically present between the upper side of the stack and the upper holding element, said spacing being so minor that an upper product of the stack cannot tilt and fall down.

DETAILED DESCRIPTION OF SPECIFIC EMBODIMENTS

By virtue of the particular suitability of the device according to the invention for stacks of folded, stapled, stitched or bound products, the invention will be described hereunder by means of a folding machine and of a stack of folded products. It is also understood that the features and advantages described in this context can also be applied substantially to all other machines and products as well as to transferring a stack from another receiving region to another depositing region in the scope of the invention.

Figure 1:
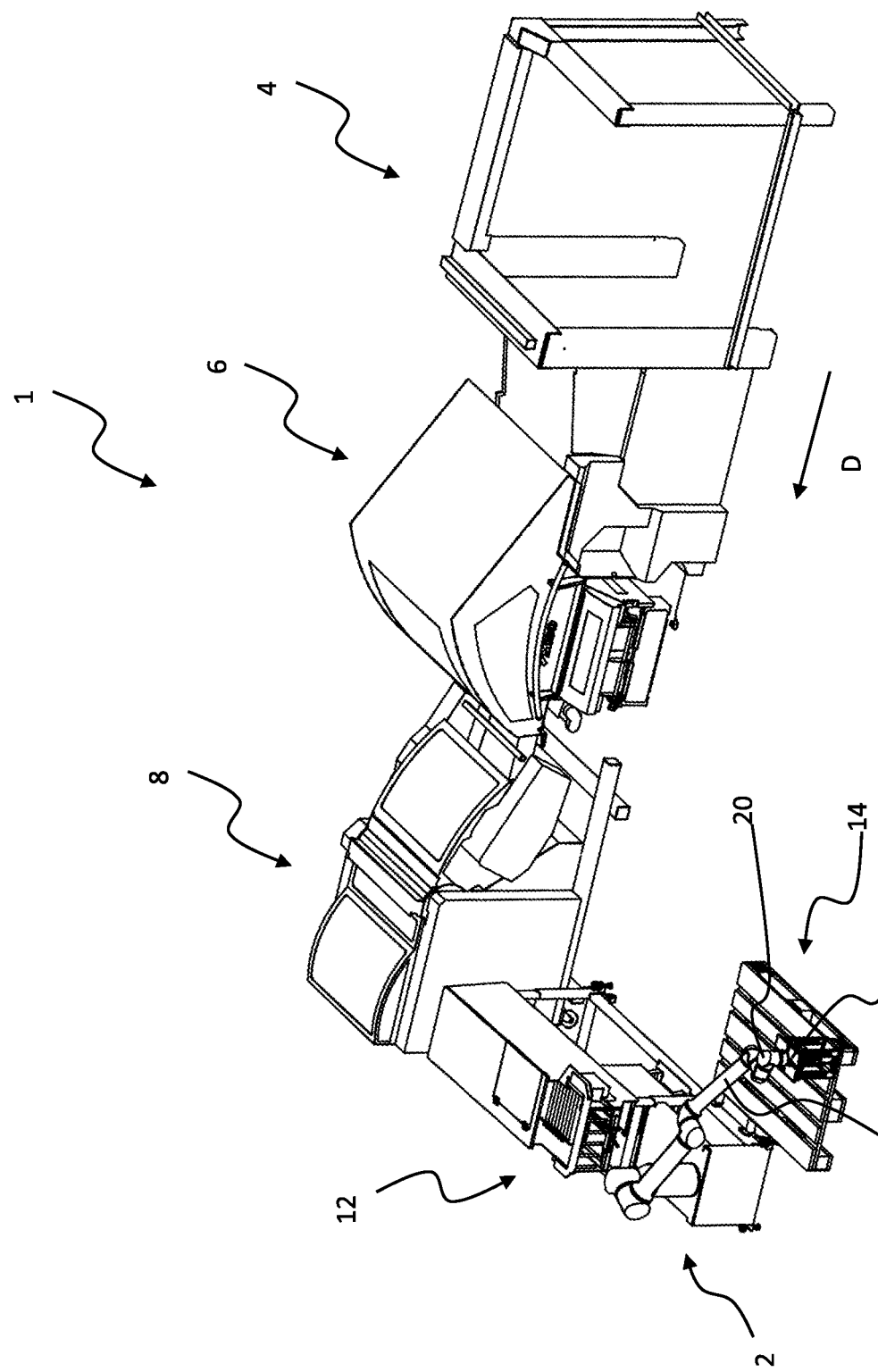
FIG. 1 schematically shows an embodiment of a folding machine having a handling device according to the invention in a perspective view.

FIG. 1 schematically shows a folding machine 1 having a handling device 2 according to an embodiment of the invention. Planar media, for example paper sheets, are provided and fed to the folding machine 1 at an infeed 4. The infeed 4 can comprise a docking unit, for example a pallet docking unit, or by means of suitable conveyor means be connected directly to an upstream processing machine, for example a printing machine.

The folding machine 1 so as to be disposed in succession along a processing direction D furthermore comprises at least one folding unit 6 for folding the planar media to the folded products, a stacking device 8 for forming a stack 10 of folded products (cf. FIG. 3 and FIG. 6) from the folded products, and a delivery region 12 for delivering the stack of folded products, said delivery region 12 generally corresponding to a receiving region 12. A stack 10 of folded products disposed in the delivery region 12 of the folding machine 1 is in this instance to be disposed in a depositing region 14 assigned to the folding machine 1. The handling device 2 is provided to this end. A transport medium such as, for example a pallet, on which the stacks 10 are deposited is preferably disposed in the depositing region 14.

The handling device 2 for transferring the stack 10 of folded products from the delivery region 12 of the folding machine 1 to the depositing region 14 assigned to the folding machine 1 comprises a gripping unit 16. The gripping unit 16 is movable in three dimensions and is specified for receiving a stack 10 of folded products disposed in the delivery region 12 and for depositing said stack 10 in the depositing region 14. Details of the gripping unit 16 are derived from the description hereunder with reference to FIGS. 2 to 6. It is understood that the handling device 2 is configured so as to be substantially independent of the folding machine 1 as long as the delivery region 12 and the depositing region 14 are situated within reach of the handling device 2.

The handling device 2 is preferably configured as a robot, in particular as a gantry robot or, as illustrated, an articulated-arm robot. The robot comprises a robotic arm 18 having a free end 20 on which the gripping unit 16 is disposed. The gripping unit 16 is connected to the robotic arm 18 by means of the connection installation, wherein the connection installation can establish a rigid connection between the gripping unit 16 and the robotic arm, or can enable an arbitrary degree of freedom of the gripping unit relative to the robotic arm 18.

Figure 2:
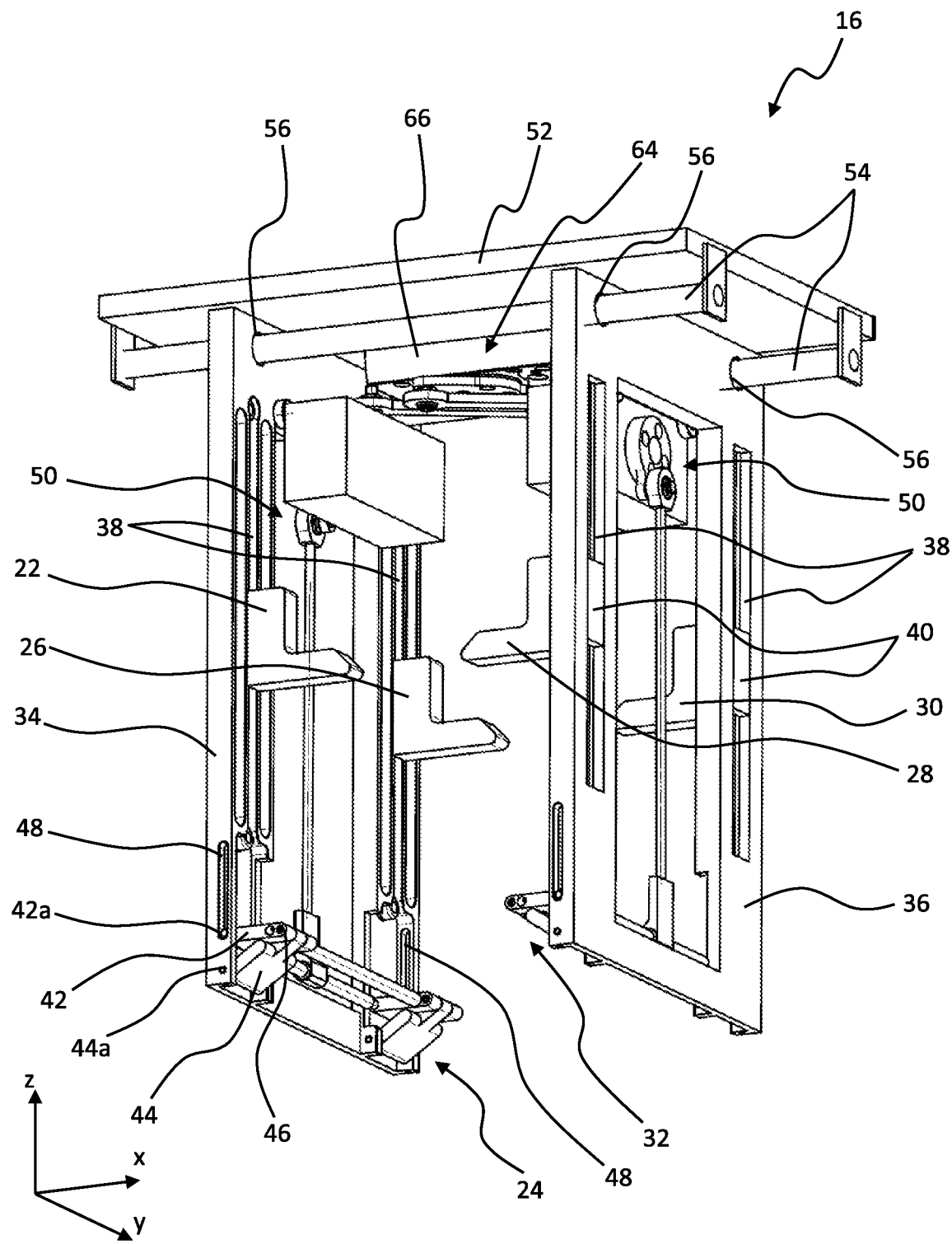
FIG. 2 shows an embodiment of a gripping unit of the handling device according to the invention in a perspective view.
Figure 3:
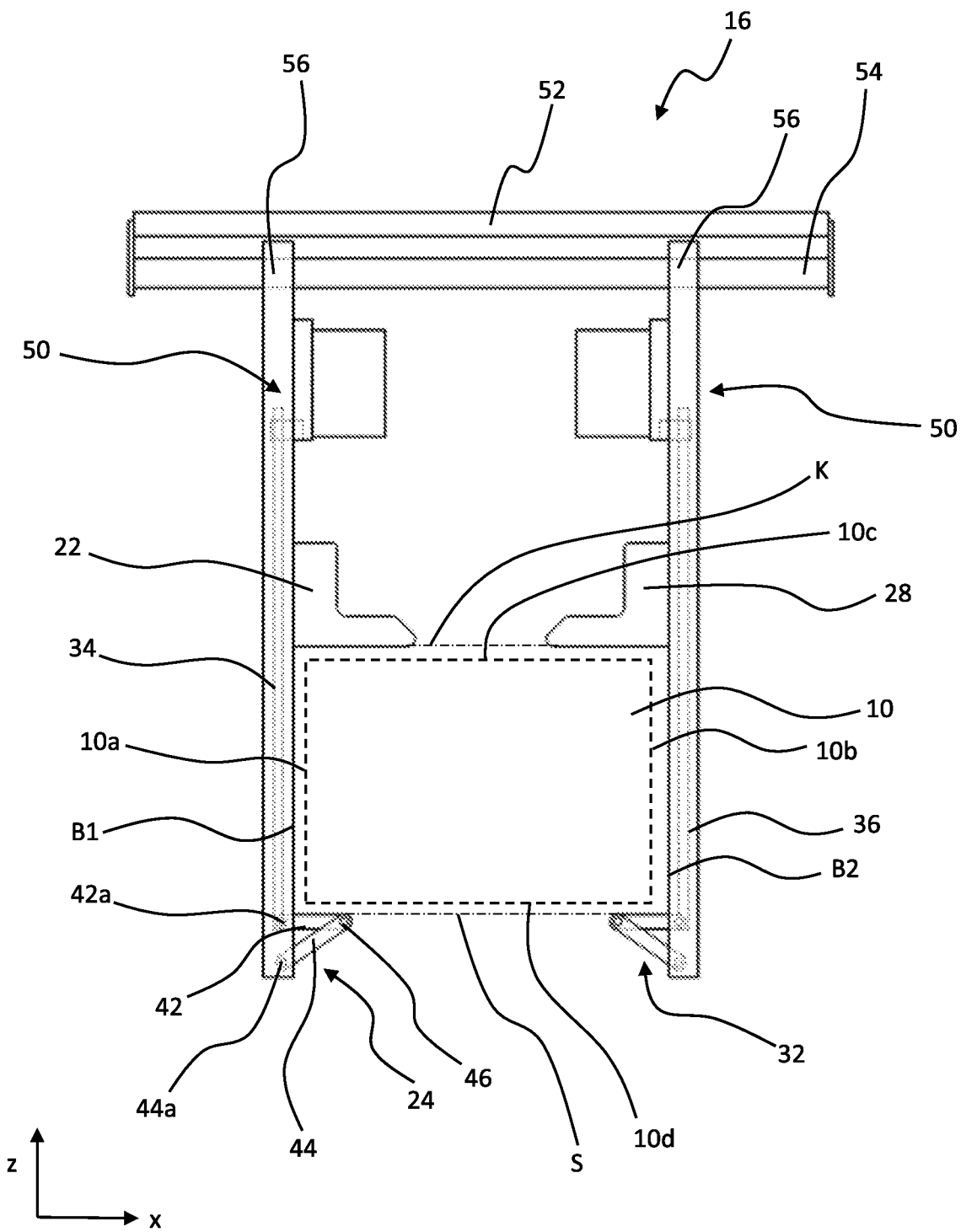
FIG. 3 shows the gripping unit of FIG. 2 in a front view.

FIGS. 2 and 3 show an embodiment of the gripping unit 16 for receiving, moving, and depositing a stack 10 of folded products, said stack 10 being indicated by dashed lines in FIG. 3. It is understood that the gripping unit 16 can be used in conjunction with any suitable handling device 2 and is not restricted to being used with a robot according to FIG. 1.

The stack 10 is substantially cuboid and comprises two mutually opposite lateral faces, specifically a left lateral face 10a and a right lateral face 10b, as well as an upper side 10c and a lower side 10d opposite the upper site 10c. The two further lateral faces which are aligned so as to be perpendicular to the left and the right lateral face 10a, 10b and to the upper and lower side 10c, 10d in the frontal view is as per FIG. 3 and FIG. 6 run so as to be parallel to the drawing plane. The stack 10 by virtue of inherent restoring forces of folded products in the region of the respective fold can restore itself in such a manner that one of the lateral faces which is formed by the spines of the folded products in a non-compressed state has a greater height than the opposite lateral face. The cuboid shape of the stack to which reference is made here is in this instance present when the folded products of the stack 10, by compressing the stack and squeezing out the air, bear on one another in a planar manner. The gripping unit 16 can of course also be used with stacks having bulged lateral faces (including the upper side and the lower side).

The gripping unit 16 comprises at least one upper holding element 22 for holding down the upper side 10c of the stack 10, and at least one lower holding element 24 for supporting the lower side 10d of the stack 10.

The gripping unit in the embodiment illustrated comprises a plurality of upper holding elements and a plurality of lower holding elements. The upper holding element 22 forms a first upper holding element 22 of the plurality of upper holding elements, and the lower holding element 24 forms a first lower holding element 24 of the plurality of lower elements. The gripping unit 16 furthermore comprises a second upper holding element 26, a third upper holding element 28, and a fourth upper holding element 30. The gripping unit 16 furthermore comprises a second lower holding element 32.

In the description hereunder reference is made to the illustrated embodiment having a plurality of upper and lower holding elements. As has been explained at the outset, a single upper and/or a single lower holding element may also be sufficient. The features described herein can be applied in analogous manner also to such embodiments.

The gripping unit 16 furthermore comprises a first lateral delimitation element 34 and a second lateral delimitation element 36 which are in each case assignable to one of the two mutually opposite lateral faces 10a, 10b of the stack 10. The first and the second delimitation element 34, 36 are mutually opposite in such a manner that said delimitation elements 34, 36 can receive the stack 10 therebetween. Once the gripping unit 16 has received a stack 10, the first and the second delimitation element 34, 36 extend so as to be substantially parallel to the two opposite lateral faces 10a, 10b of the stack 10.

The lower holding elements 24, 32 in the position illustrated in FIGS. 2 and 3 in which said holding elements 24, 32 are specified for receiving a stack 10 define a support plane S for bearing the stack 10. The support plane S is preferably horizontally aligned so as to guarantee that the stack 10 is received in a stable manner.

The upper holding elements 22, 26, 28, 30 can define a contact plane K which is aligned so as to be parallel to the support plane S. It is preferable for the upper holding elements 22, 26, 28, 30 to further compress the stack 10 of folded product such that the upper side 10c of the stack 10 is aligned in the contact plane K and air present in the stack 10 is squeezed out of the latter. However, this is not mandatory with a view to the safe handling of the stack 10.

The plurality of upper holding elements 22, 26, 28, 30 can be movable relative to the plurality of lower holding elements 24, 32. The upper holding elements 22, 26, 28, 30 and the lower holding elements 24, 32 are movable relative to one another in a direction perpendicular to the support plane S, or perpendicular to the lower side 10d of the received stack 10. Only the upper holding elements 22, 26, 28, 30 or only the lower holding elements 24, 32 herein can be configured so as to be movable, or the upper as well as the lower holding elements 22, 24, 26, 28, 30, 32 are movably mounted.

The upper holding elements 22, 26, 28, 30 in the embodiment illustrated are mounted so as to be linearly displaceable along at least one of the first and the second delimitation element 34, 36. In particular, the first and the second upper holding element 22, 26 are mounted so as to be linearly displaceable along the first delimitation element 34, and the second and the third upper holding element 28, 30 are mounted so as to be displaceable along the second delimitation element 36.

To this end, the first and the second delimitation element have in each case a guide 38 for each of the upper holding element 22, 26, 28, 30 that is movable along the respective delimitation element 34, 36. The guide 38 extends so as to be parallel to the envisaged direction of movement of the upper holding elements 22, 26, 28, 30. Suitable linear guides are known to the person skilled in the art and can be used here. For example, a guide 38 in the delimitation elements 34, 36 can be configured as a groove which receives a guiding portion 40 of the respective upper holding element 22, 26, 28, 30 and guides said guiding portion along the longitudinal direction of the groove, as is illustrated in FIG. 2.

The upper holding elements 22, 26, 28, 30 in the embodiment illustrated are freely displaceable along the respective delimitation element 34, 36. This means that no drive and no preloading means which move the upper holding elements 22, 26, 28, 30 to a predefined position or hold said holding elements in such a predefined position are provided. The free movement of the upper holding elements 22, 26, 28, 30 here is only restricted by an upper end and a lower end of the respective guide 38 where the upper holding elements 22, 26, 28, 30 impact when displaced to the maximum. Alternative mountings or guides of the upper holding elements 22, 26, 28, 30 are likewise conceivable as is the use of a drive or of a preloading means for the upper holding elements 22, 26, 28, 30.

Alternatively or additionally, the plurality of lower holding elements 24, 32 can be mounted so as to be linearly displaceable along at least one of the first and the second delimitation element 34, 36. The lower holding elements 24, 32, in a manner analogous to the linearly displaceable mounting of the upper holding elements 22, 26, 28, 30, can be mounted in the corresponding delimitation element 34, 36. In general, the configuration and the mounting of the lower holding elements 24, 32 is independent of the configuration and the mounting of the upper holding elements 22, 26, 28, 30.

The plurality of lower holding elements 24, 32 can also be mounted so as to be pivotable in relation to at least one of the first and the second delimitation element 34, 36. To this end, the respective delimitation element 34, 36 is pivotally connected to the respective lower holding element 24, 32, for example by means of a suitable rotary joint.

The lower holding elements 24, 32 can be mounted so as to be linearly displaceable as well as pivotable in relation to the respective delimitation element 34, 36. The embodiment illustrated visualizes such a combined mounting of the lower holding elements 24, this being described in more detail by means of the first lower holding element 24. The second lower holding element 32 can be configured in a manner analogous to the first lower holding element 24 and be correspondingly mounted on the second delimitation element 36.

The lower holding element 24 is configured in multiple parts and comprises at least one first portion 42 and one second portion 44. The first portion 42 by means of a rotation axle 42a is mounted so as to be pivotable on the first delimitation element 34. The second portion 44 by means of a rotation axle 44a is mounted so as to be pivotable on the first delimitation portion 34. The first and the second portion 42, 44 of the lower holding element 24 at the respective free end are in each case also connected to one another in an articulated manner by means of a third rotation axle 46. The first, the second, and the third rotation axle 42a, 44a, 46 can be configured in one part, in the like manner as the first portion 42 and the second portion 44, or be configured in multiple parts such as according to FIG. 2 is the case for the first portion 42, the second portion 44, and the second rotation axle 44a.

The first rotation axle 42a of the first portion 42 of the lower holding element 24 is mounted so as to be linearly displaceable along the first delimitation element 34. To this end, the delimitation element 34 has suitable means such as, for example, a guide or a groove for receiving the first rotation axle 42a. According to FIG. 2, the first rotation axle 42a by way of one end is in each case received in one of two mutually opposite guide grooves 48 of the first delimitation element 34.

When the first portion 42, or the rotation axle 42a thereof, respectively, is displaced linearly along the first delimitation element 34, the first portion 42 of the lower holding element 24 pivots about the first rotation axle 42a. At the same time, the first and the second portion 42, 44 pivot relative to one another about the third rotation axle 46, this in turn causing the second portion 44 to pivot about the second rotation axle 44a. On account thereof, the lower holding element 24 falls in the direction of the first delimitation element 34. The lower holding element 24 in this position does not protrude into the intermediate space between the first and the second delimitation element 34, 36.

In order for the movement of the lower holding element 24 to be generated, the latter can furthermore have suitable drive means 50 which are described in more detail with reference to FIG. 4.

It is preferable for the lower holding elements 24, 32 to be movable between a first position in which they do not protrude substantially into an intermediate space between the first and the second delimitation element 34, 36 (cf. FIGS. 6a, 6b) and a second position in which the lower holding elements 24, 32 protrude into the intermediate space between the first and the second delimitation element 34, 36 and delimit the intermediate space in a downward manner so as to form a receptacle for the stack 10 (cf. FIGS. 2, 3). The lower holding elements 24, 32 in the second position are specified for receiving a stack 10 and define the support plane S.

This mobility between the first and the second position is preferably implementable by the mechanism of the lower holding elements which has been described above, wherein a soft depositing of the stacking in the depositing region is achieved at the same time. Other mechanisms such as, for example, a simpler linear displacement capability or simple folding of a holding element in one part are likewise conceivable.

Independently of the configuration and the mounting of the upper and the lower holding elements 22 to 32, the first and the second delimitation element 34, 36 can be movable relative to one another. Only one of the two delimitation elements 34, 36 can be movable herein; however both delimitation elements 34, 36 can also be movable.

The first and the second delimitation element 34, 36 are preferably movable in a linear manner in the direction of the respective lateral face 10a, 10b of the received stack 10, which faces the respective delimitation element 34, 36. The direction of movement of the first and of the second delimitation element 34, 36 is thus parallel to the support plane S and perpendicular to the two mutually opposite lateral faces 10a, 10b of the stack 10. It is preferable for the first and the second delimitation element 34, 36 to be movable relative to one another so far that said delimitation element 34, 36 bear on the respective lateral face 10a, 10b of the stack 10. On account thereof, the stack 10 is further secured and reliably maintains the shape thereof while being moved by the gripping unit 16.

To this end, the first delimitation element 34 defines a first delimitation plane B1, and the second delimitation element 36 defines a second delimitation plane B2. The delimitation planes B1 and B2 are disposed so as to be perpendicular to the support plane S as well as parallel to the lateral faces 10a, 10b of a received stack 10.

In order for the first and the second delimitation element 34, 36 to be mounted so as to be movable relative to one another, the gripping unit 16 preferably comprises a support 52 on which at least one of the first and the second delimitation element 34, 36 is mounted so as to be linearly displaceable. The support 52 in the embodiment illustrated comprises two guide bars 54, and the first and the second delimitation element 34, 36 comprise corresponding openings 56 through which the guide bars 54 extend. The delimitation elements 34, 36 are displaceable along the guide bars 54.

Figure 5:
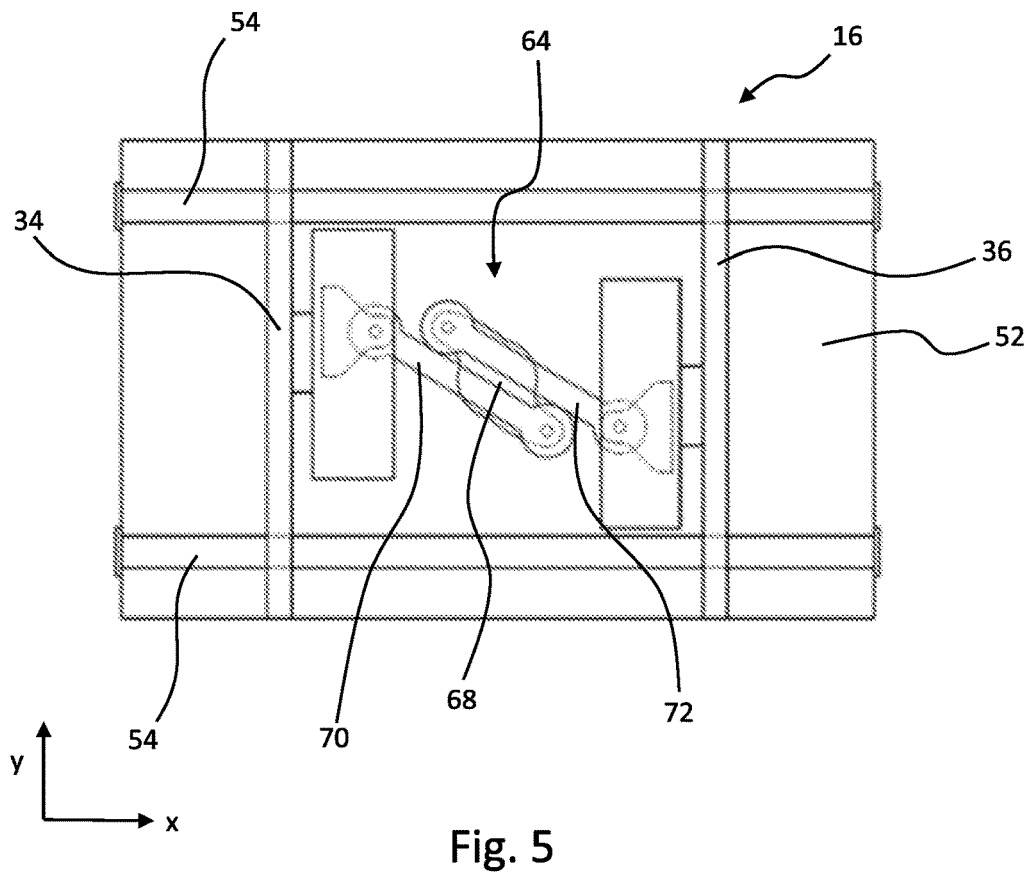
FIG. 5 shows the gripping unit of FIG. 2 in a view from below.

The first and the second delimitation element 34, 36 can in each case be moved by a dedicated drive, or said delimitation element 34, 36 by means of a suitable mechanism can be coupled to a common drive as is described with reference to FIG. 5.

A Cartesian coordinate system is moreover indicated in FIGS. 2 to 7. It is preferable for the x-y plane of said coordinate system to be horizontally aligned, and for the z-axis to be vertically aligned. The support plane S is preferably parallel to the x-y plane. The first and the second holding elements 22, 24, 26, 28, 30, 32 are preferably movable relative to one another in the direction of the z-axis, while the first and the second delimitation element 34, 36 are preferably movable relative to one another in the direction of the x-axis. The two mutually opposite lateral faces 10a, 10b of the stack 10 are in this instance aligned so as to be parallel to the y-z plane. The rotation axles 42a, 44a, 46 preferably extend parallel to the y-axis. The gripping unit 16 is finally preferably mounted on the handling device 2 so as to be rotatable about the z-axis.

Figure 4:
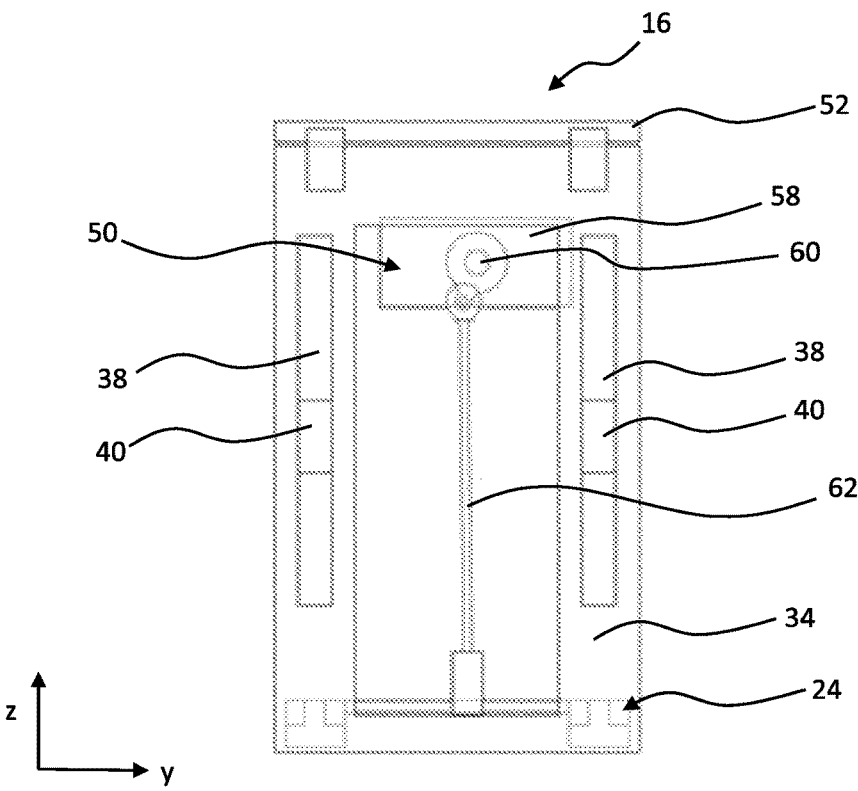
FIG. 4 shows the gripping unit of FIG. 2 in a lateral view.

FIG. 4 for explaining the drive means 50 for the first lower holding element 24 shows the gripping unit 16 in a lateral view. Corresponding drive means can also be provided for the second lower holding element 32. The drive means 50 in this embodiment are specified for moving the first rotation axle 42a of the first holding element 24 perpendicular to the support plane S. The drive means 50 comprise a rotary drive 58 having an output shaft 60 which is rotatable by the latter. A connecting rod 62 is eccentrically mounted on the output shaft 60, wherein the end of the connection rod 62 opposite the output shaft 60 is connected to the lower holding element 24, preferably to the first rotation axle 42a of the lower holding element 24. The connection rod 62 is pivotable in relation to the lower holding element 24. On account of this arrangement, a rotating movement of the output shaft 60 is converted to a linear stroke movement of the lower holding element 24. The lower holding element 24 by means of the rotation axle 42a of the first portion 42 of the lower holding element 24 herein is guided in a linear manner in the first delimitation element 34. Alternative drives, or drive mechanisms, respectively, are readily conceivable.

The drive mechanism 64 for moving the first and the second delimitation element 34, 36 will be described by means of FIG. 5. The drive mechanism 64 comprises a rotary drive 66 (FIG. 2) having an output shaft 68 which is driven by the latter and on which an entrainment element 68 is mounted in a rotationally fixed manner. A first connection bar 70 and a second connection bar 72 are rotatably mounted on the entrainment element 68 so as to be eccentric in relation to the output shaft 68 of the rotary drive 66. The first connection bar 70 by way of an end opposite the entrainment element 68 is pivotally connected to the first delimitation element 34, and the second connection bar 72 by way of an end opposite the entrainment element 68 is pivotally connected to the second delimitation element 36. A rotation of the entrainment element 68 by the rotary drive 66 causes said rotating movement by means of the first and the second connection bar 70, 72 to be converted in a linear movement of the first and the second delimitation element 34, 36. The first and the second delimitation element 34, 36 herein are preferably guided along the guide bars 54. Depending on the rotating direction of the rotary drive 66 and of the entrainment element 68, the first and the second delimitation element 34, 36 are diverged or converged. Other drive mechanisms can readily be used here too.

The gripping unit 16 is illustrated in various states during the method according to the invention in FIGS. 6a to 6g. It is understood that the focus here is rather on the method steps carried out by the gripping unit 16 than on the device features of the gripping unit 16 provided to this end. The method explained hereunder can therefore also be carried out with alternative embodiments of the gripping unit 16 and is not restricted to the embodiment illustrated and described with reference to FIGS. 1 to 5.

Figures 6A, 6B:
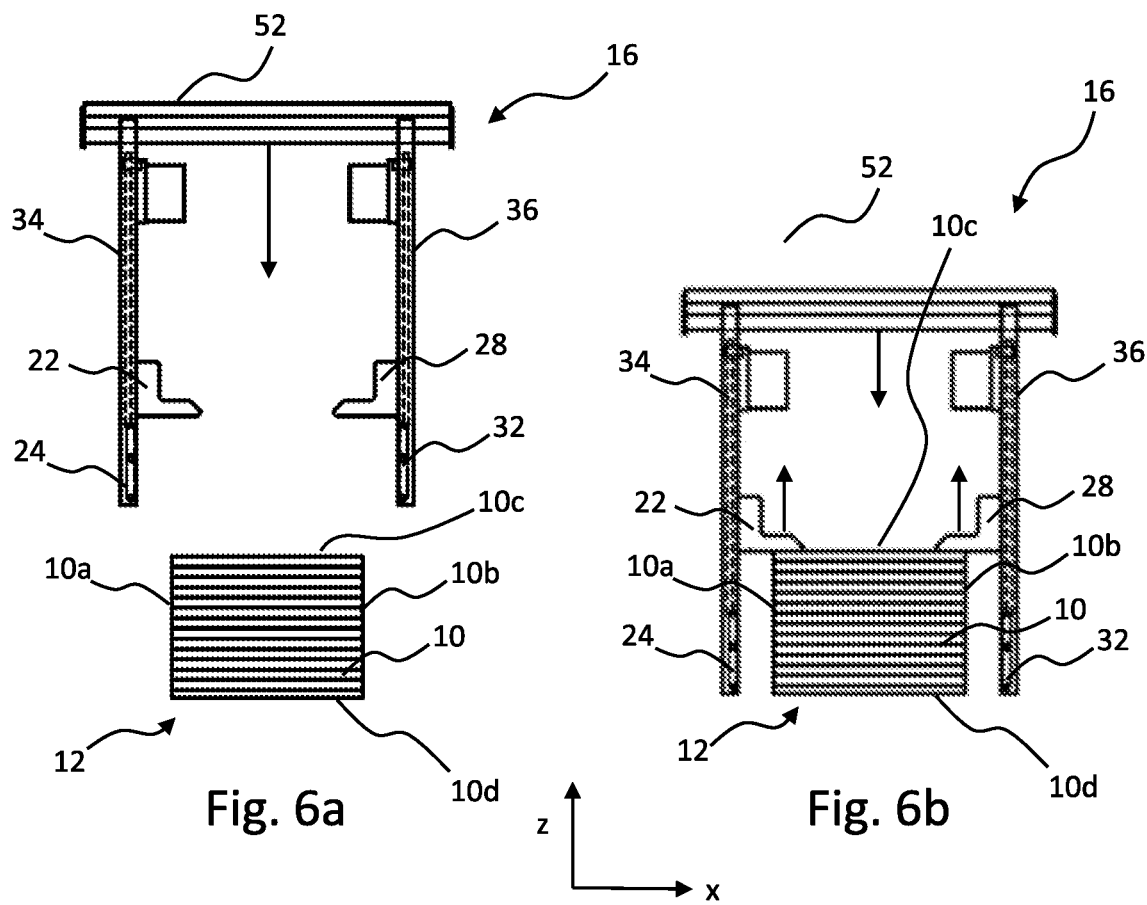
FIGS. 6a-6g show the gripping unit of FIG. 2 in a front view in various states during the handling process.

According to FIG. 6a the stack 10 is disposed in the delivery region 12 of the folding machine 1. As per FIGS. 6a and 6b the gripping unit 16 is likewise disposed in the delivery region 12. It is preferable herein for the gripping unit 16 to be disposed in such a manner that two mutually facing lateral faces 10a, 10b of the stack 10 of folded products are disposed between the first and the second delimitation element 34, 36 of the gripping unit 16. The upper side 10c of the stack 10 is disposed below or in the contact plane K of the upper holding elements 22, 26, 28, 30, and the lower side 10d of the stack is disposed above the support plane S defined by the lower holding elements 24, 32 such that the upper side 10c and the lower side 10d of the stack 10 are disposed between the upper holding elements 22, 26, 28, 30 and the lower holding elements 24, 32.

It can be seen in FIG. 6a that the gripping unit 16 is initially disposed above the stack 10 and is then moved downward in a substantially linear vertical manner. The lower holding elements 24, 32 are situated in the first position in which said holding elements 24, 32 do not protrude into the intermediate space between the first and the second delimitation elements 34, 36. The upper holding elements 22, 26, 28, 30 are situated in a lower position in which the guide portion 40 of said holding elements 22, 26, 28, 30 impacts the lower end of the guide 38 configured as a groove (cf. FIG. 2). The first and the second delimitation element 32, 34 are disposed so as to be mutually spaced apart in the horizontal direction such that the spacing defined therebetween is larger than the spacing between the two opposite lateral faces 10a, 10b of the stack 10. On account thereof, the first and the second delimitation element 34, 36 do not collide with the stack 10 when said delimitation element 34, 36 are moved downward.

As can be seen in FIG. 6b, the upper holding elements 22, 26, 28, 30 come into contact with the upper side 10c of the stack 10 when the gripping unit 16 is moved further downward. When the gripping unit then moves further downward, the upper holding elements 22, 26, 28, 30 are displaced along the guide 38 in an upward manner relative to the delimitation element 34. On account thereof, the upper side 10c is reliably held down by the upper holding elements 22, 26, 28, 30 during the further displacement.

The gripping unit 16 is moved downward so far until the lower holding elements 24, 32 are disposed below the lower side 10d of the stack 10, or the plane defined by said holding elements 24, 32. To this end, it is preferable that the delivery region 12 of the folding machine 1 is configured in such a manner that said delivery region 12 in the region of the delimitation elements 34, 36 and of the lower holding element 24 has recesses for said delimitation element 34, 36 and said holding element 24, while said delivery region in the region of the lower side 10c of the stack 10 forms a sufficient bearing face for the stack 10.

When the gripping unit 16 is disposed as desired in the delivery region 12, the stack 10 of folded products disposed in the delivery region 12 is received by means of the gripping unit 16.

Figure 6C:
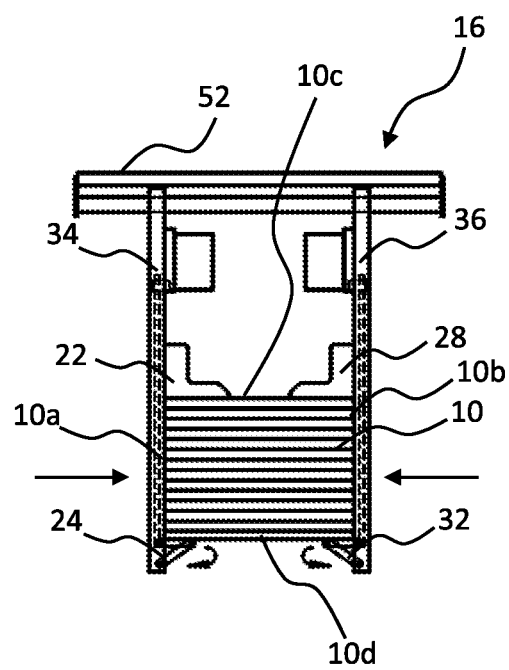

FIG. 6c shows that the lower holding elements 24, 32 to this end are moved from the first position to the second position in which the lower holding elements 24, 32 protrude into the intermediate space between the first and the second delimitation element 34, 36 and delimit said intermediate space in a downward manner so as to form a receptacle for the stack 10 and to define the support plane S. While the lower holding elements 24, 32 are moved from the first position to the second position, the lower holding elements 24, 32 can be disposed so as to be spaced apart from the lower side 10c of the stack 10 and conjointly with the gripping unit 16 be moved upward until coming into contact with the lower side 10c of the stack 10 only after being moved to the second position. The gripping unit 16 can however also be disposed such that the lower holding elements 24, 32 touch the lower side 10c of the stack 10 as soon as said lower holding elements 24, 32 are moved to the second position. The upper holding elements 22, 26, 28, 30, by virtue of the free mounting thereof, at all times follow the upper side 10c of the stack 10.

As can likewise be seen in FIG. 6c, at least one of the first and the second delimitation element 34, 36, presently both delimitation elements 34, 36, are moved in the direction of the lateral face 10a, 10b of the stack 10 that faces the respective delimitation element 34, 36. The delimitation element 34, 36 are preferably moved so far in the direction of the lateral faces 10a, 10b of the stack 10 until said delimitation element 34, 36 touch said lateral faces 10a, 10b so as to laterally support the stack 10. The moving of the delimitation element 34, 36 can take place before, after, or contemporaneously with moving the lower holding element 24, 32 to the second position.

In the state illustrated in FIG. 6c, the stack 10 is completely received by the gripping unit 16. The gripping unit 16 preferably bears on at least four sides of the stack 10 so as to secure the folded products of the stack 10 in the mutual relative position of said folded products and to thus enable the stack 10 to be transported in a safe and dimensionally stable manner. The upper holding elements 22, 26, 28, 30 bear on the upper side 10c of the stack 10 and are preferably conceived in such a manner that the force of the weight of said holding elements 22, 26, 28, 30 squeezes air out of the stack 10 such that the folded products assume substantially planar shape.

The received stack 10 of folded products 10 is then lifted and by means of the gripping unit 16 moved from the delivery region 12 to the depositing region 14.

Figure 6D:
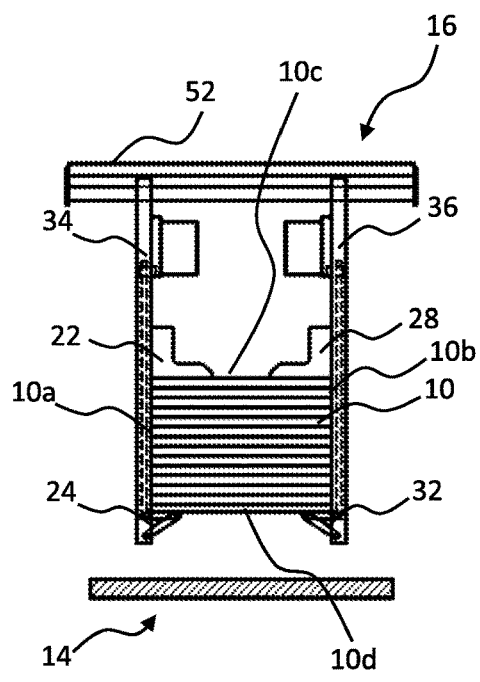
Figure 6E:
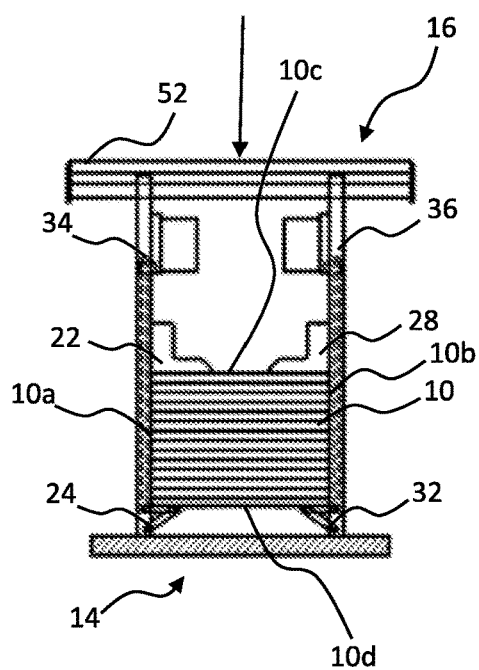

As is derived from viewing FIGS. 6d and 6e in combination, the gripping unit 16 is initially disposed above the depositing region 14 and is then moved to the corresponding depositing position provided for the respective stack 10. The gripping unit 16 is moved downward as far as possible so as to cause a minimum spacing between the lower side 10c of the stack 10 and the depositing face of the depositing region 14.

Since a standardized transport medium for the stack 10 of folded products is typically provided in the depositing region 14, it may be the case that it is not possible for the delimitation elements 34, 36 to be moved through corresponding recesses in the transport medium, or the depositing face, respectively. The lower side 10c of the stack 10 in this instance cannot be brought in direct contact with the depositing face by way of the gripping unit 16 according to the embodiment illustrated. Rather, a spacing of a size determined by the construction of the lower holding elements 24, 32 remains between the lower side 10c of the stack 10 and the depositing face. It is understood that the transport medium, or the depositing region 14, respectively, can also be adapted to the gripping unit 16 such that direct depositing of the stack 10 on the depositing face of the depositing region 14 is possible.

When the gripping unit 16 is disposed in the depositing region 14, the moved stack 10 of folded products is deposited in the depositing region 14. The lower holding elements 24, 32 in the embodiment illustrated are moved from the second position to the first position, on account of which the stack 10 is released in a downward manner.

Figure 6F:
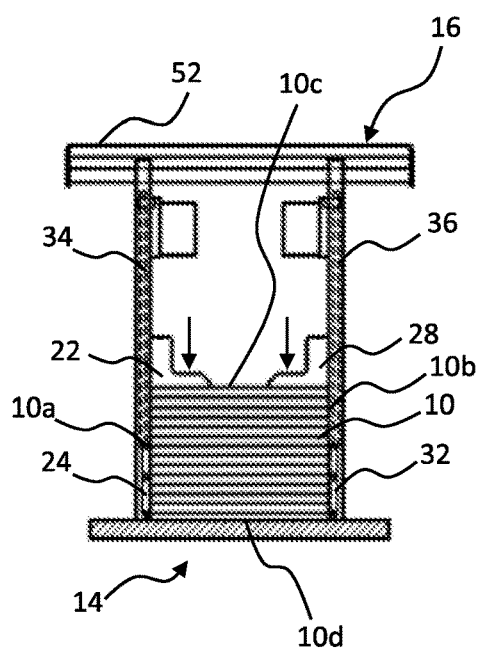

As can be seen in FIG. 6f, the stack 10 then slides downward until the lower side 10d of the stack 10 bears in a planar manner in the depositing region 14. The upper holding elements 22, 26, 28, 30 herein are entrained by the upper side 10c of the stack 10 until the lower side 10d of the stack 10 bears in the depositing region 14. On account thereof, the folded products of the stack 10 are secured until finally deposited in the depositing region 14. It is furthermore preferable for the stack 10 while sliding downward is also guided by the first and the second delimitation element 34, 36. Accordingly, the first and the second delimitation element 34, 36 are preferably moved away laterally from the stack 10 only once the latter bears completely in the depositing region 14.

Figure 6G:
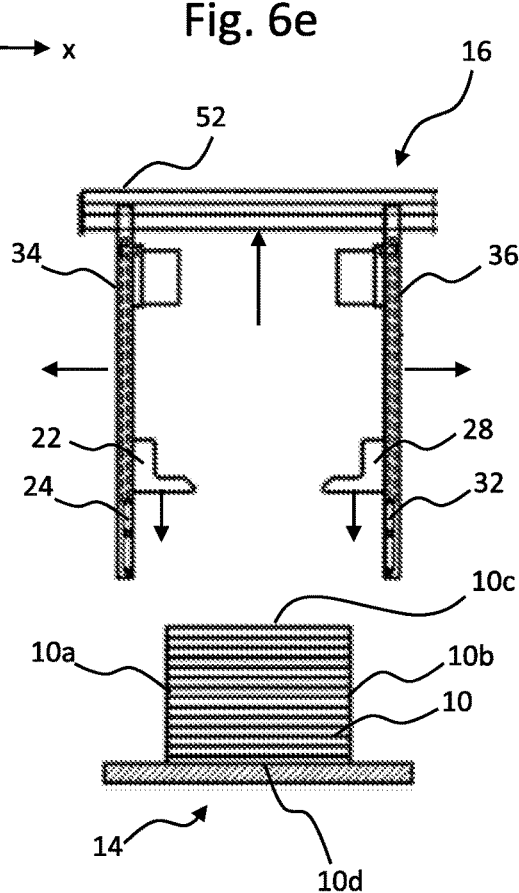

According to FIG. 6g, the gripping unit 16 can then be moved out of the depositing region 14. When the gripping unit 16 is lifted out of the depositing region 14, the upper holding elements 22, 26, 28, 30 slide downward relative to the delimitation elements 34, 36.

Once the gripping unit 16 can no longer collide with the stack 10, said gripping unit 16 is moved back to the delivery region 12 so as to repeat the method for at least one further stack 10 of folded products.

One or a plurality of subsequent stacks of folded products is/are then moved in an analogous manner from the delivery region 12 to the depositing region 14. The depositing of the stacks 10 in the depositing region 14 then preferably takes place in a predetermined pattern in which the stacks 10 are disposed so as to be mutually offset.

Figure 7A:
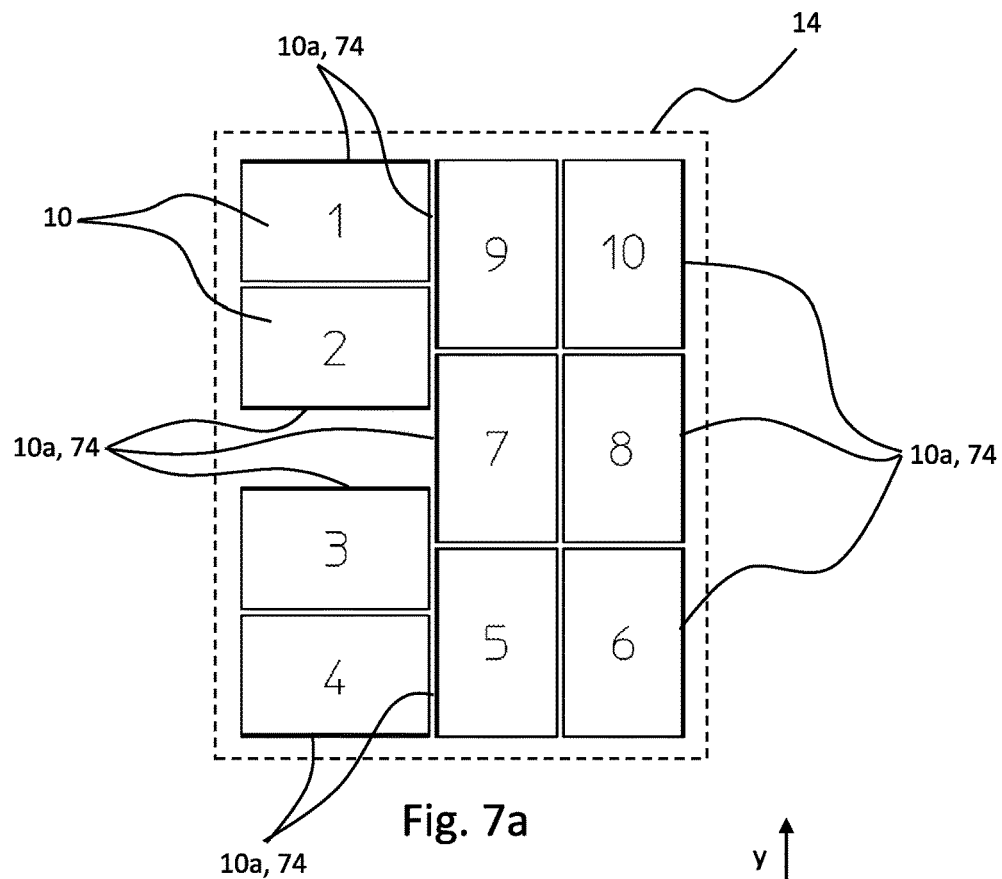
FIGS. 7a, b show in each case in a schematic manner a pattern for depositing stacks in a plan view.
Figure 7B:
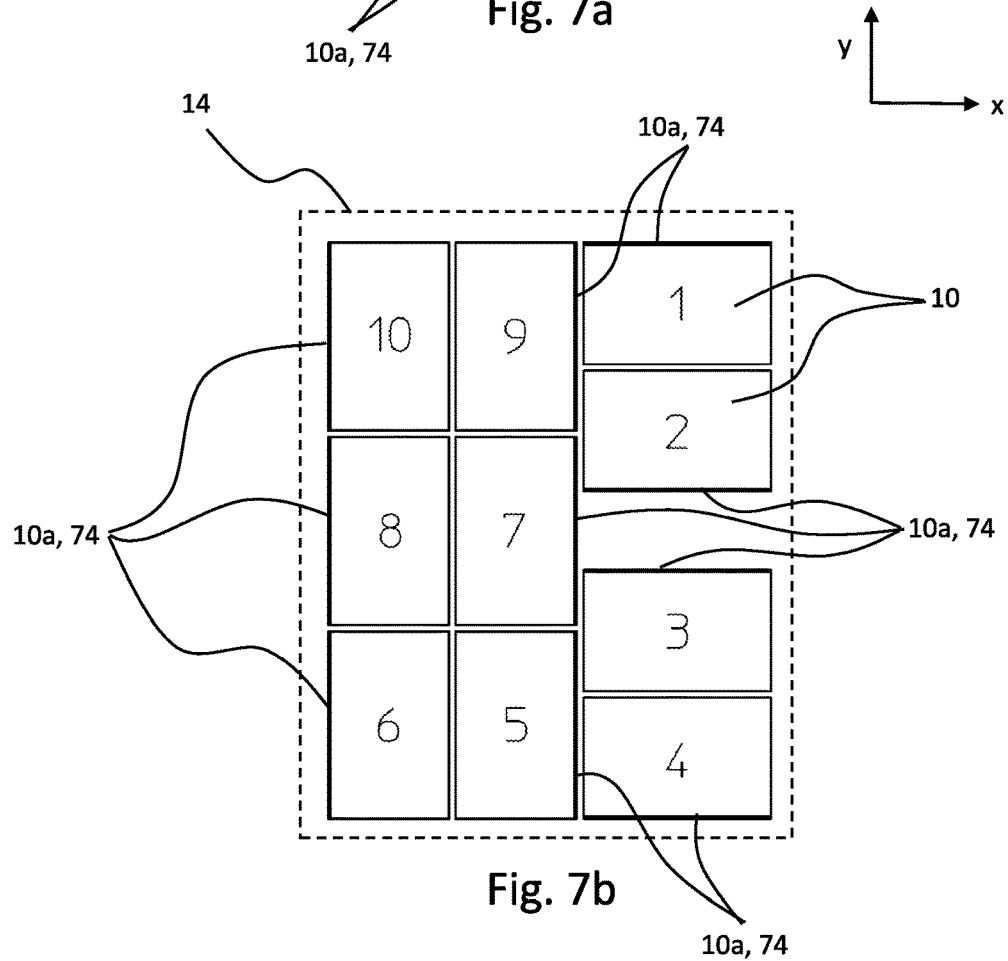

FIGS. 7a and 7b show potential predetermined patterns for depositing the stacks 10. Ten stacks 10 numbered 1 to 10 herein are in each case disposed in the depositing region 14, preferably on a transport medium. According to the predetermined pattern, two stacks 10 in the depositing region 14 are disposed so as to be opposite in such a manner that the lateral faces 10a of the stacks face away from one another, said lateral faces 10a being in each case formed by spines 74 of the folded products of the two stacks 10. This means that lateral faces 10b of the stack 10 that are opposite the lateral faces 10a formed by the spines 74 face one another. The stacks 10 of folded products in the region of the lateral face 10a have a greater height than in the region of the opposite lateral faces 10b. It is achieved on account of the predetermined pattern that the folded products of a stack 10 are inclined downward in the direction of an opposite stack 10. In the event of the folded products slipping it is thus avoided that the folded products fall out of the depositing region 14, or from the transport medium, respectively.

The stacks 10 are therefore preferably always disposed in pairs in the depositing region 14; in order for an optimal utilization of the available area in the depositing region 14, or on the transport medium, respectively, to be achieved the pairs of stacks 10 can also be mutually aligned in a dissimilar manner. In the pattern illustrated in FIG. 7a, the pairs 1-2 and 3-4 of stacks 10 are therefore rotated by 90° relative to the pairs 9-10, 7-8, 5-6 of stacks 10. Should the available area not permit the depositing of stacks 10 disposed only in pairs in the depositing region, individual stacks 10 may also be disposed in a row, for example. In this instance it is preferable for the lateral face 10a of said stacks 10 formed by the spines 74 of the folded products to face outward in relation to the depositing region such that the folded products in the event of slipping slip at worst in the interior of the depositing region 14, or of the transport medium, respectively, and do not drop down from there.

The pattern according to FIG. 7b is a mirror-inverted pattern as per FIG. 7a. For example, the pattern as per FIG. 7a can represent a first layer of stacks 10 on a transport medium. A separation element such as, for example of cardboard, which covers all stacks 10 of the first layer can be disposed on said first layer of stacks 10. A second layer of stacks 10 according to the pattern as per FIG. 7b can then be disposed on the separation element. In this way, a uniform distribution of weight is achieved on the transport medium, and a mutually oblique orientation of the layers is avoided.

It is understood that the predetermined patterns can be adapted in an arbitrary manner to the size of the depositing region 14, or of the transport medium, as well as to the dimensions of the stacks 10.

It can furthermore be seen from FIGS. 7a and 7b that the handling device 2 of the gripping unit 16 has to provide sufficient potential for movement. In order for the stacks to be disposed in a mutually offset manner in the depositing region 14, the gripping unit 16 has to be movable at least in two directions in one plane, preferably the x-y plane. In order for the stacks 10 to be disposed so as to be mutually rotated in the depositing region 14, the gripping unit 16 has to be rotatable about one axis, preferably the z-axis. In order to furthermore dispose a plurality of layers of stacks on top of one another and/or to overcome a height differential between the delivery region 12 and the depositing region 14, the gripping unit 16 is furthermore to be configured so as to be movable perpendicularly to the plane of the depositing region 14, thus typically in the z-direction. An arbitrary lateral offset in the x-y direction between the delivery region 12 and the depositing region 14 is also to be considered. The configuration of the handling device 2 as an articulated-arm robot has therefore proved particularly advantageous in order to enable sufficient freedom of movement for the gripping unit 16.

The invention claimed is:

1. A handling device for transferring a stack of folded, stapled or bound products, from a receiving region to a depositing region,
   wherein the handling device comprises a gripping unit which is movable in three dimensions and which is specified for receiving the stack of products disposed in the receiving region, for moving the stack, and for depositing the stack in the depositing region;
   wherein the gripping unit comprises at least one upper holding element for holding down an upper side of the received stack, and at least one lower holding element for supporting a lower side, opposite the upper side, of the received stack;
   wherein the gripping unit further comprises a first lateral delimitation element and a second lateral delimitation element, which are in each case assignable to two mutually opposite lateral faces of the stack at inner surfaces of the first lateral delimitation element and the second lateral delimitation element;
   wherein the first lateral delimitation element comprises a guide extending along the first lateral delimitation element, the at least one upper holding element being linearly displaceable along said guide, wherein the at least one upper holding element is preloaded to a predetermined position or is freely movable within said guide, and wherein the at least one upper holding element protrudes from said guide towards the second lateral delimitation element.

2. The handling device of claim 1, wherein the at least one upper and the at least one lower holding element are movable relative to one another.

3. The handling device of claim 1, wherein the second lateral delimitation element comprises a further guide extending along the second lateral delimitation element, at least one further upper holding element being linearly displaceable along said further guide and along the second lateral delimitation element, wherein the at least one further upper holding element is preloaded to a predetermined position or is freely movable within said further guide, and wherein the at least one further upper holding element protrudes from said further guide towards the first lateral delimitation element.

4. The handling device of claim 1, wherein the lower holding element in a support position defines a support plane for bearing the stack, and the first lateral delimitation element and the second lateral delimitation element extend so as to be substantially perpendicular to the support plane.

5. The handling device of claim 1, wherein the first lateral delimitation element and the second lateral delimitation element are movable relative to one another.

6. The handling device of claim 5, wherein at least one of the first lateral delimitation element and the second lateral delimitation element is mounted so as to be linearly displaceable on a support of the gripping unit.

7. The handling device of claim 1, wherein the at least one lower holding element includes a first and a second lower holding element, wherein the first lower holding element is supported on the first lateral delimitation element and the second lower holding element is supported on the second lateral delimitation element,
   wherein the two lower holding elements, in a supporting position, define a supporting plane for bearing the stack of products, and
   wherein, in the supporting position, the first lower holding element and the second lower holding element protrude from the first lateral delimitation element and the second lateral delimitation element, respectively, in a direction towards the respective other lateral delimitation element.

8. The handling device of claim 1, wherein the at least one lower holding element is mounted so as to be linearly displaceable along at least one of the first lateral delimitation element and the second lateral delimitation element.

9. The handling device of claim 1, wherein the at least one lower holding element is mounted so as to be pivotable in relation to at least one of the first lateral delimitation element and the second lateral delimitation element.

10. The handling device of claim 1, wherein the handling device furthermore comprises a robot, and the robot comprises a robotic arm having a free end, wherein the gripping unit is disposed on the free end of the robotic arm.

11. A folding machine which, in succession along a processing direction, comprises:
    at least one folding unit for folding planar media so as to form folded products;
    a stacking device for forming a stack from the folded products;
    a receiving region for receiving the stack of folded products from the stacking device;
    a handling device for transferring the stack of folded, stapled or bound products from the receiving region to a depositing region,
    wherein the handling device comprises a gripping unit which is movable in three dimensions and which is specified for receiving the stack of products disposed in the receiving region, for moving the stack, and for depositing the stack in the depositing region;
    wherein the gripping unit comprises at least one upper holding element for holding down an upper side of the received stack, and at least one lower holding element for supporting a lower side, opposite the upper side, of the received stack;

wherein the gripping unit further comprises a first lateral delimitation element and a second lateral delimitation element which are in each case assignable to two mutually opposite lateral faces of the stack at inner surfaces of the first lateral delimitation element and the second lateral delimitation element;

wherein the first lateral delimitation element comprises a guide extending along the first lateral delimitation element, the at least one upper holding element being linearly displaceable along said guide, wherein the at least one upper holding element is preloaded to a predetermined position or is freely movable within said guide, and wherein the at least one upper holding element protrudes from said guide towards the second lateral delimitation element.

12. The folding machine of claim 11, wherein the second lateral delimitation element comprises a further guide extending along the second lateral delimitation element, at least one further upper holding element being linearly displaceable along said further guide and along the second lateral delimitation element, wherein the at least one further upper holding element is preloaded to a predetermined position or is freely movable within said further guide, and wherein the at least one further upper holding element protrudes from said further guide towards the first lateral delimitation element.

13. A method for transferring stacks of folded, stapled or bound products, from a receiving region to a depositing region,
   wherein a handling device comprises a gripping unit which is movable in three dimensions;
   wherein the gripping unit comprises at least one upper holding element, and at least one lower holding element;
   wherein the gripping unit further comprises a first lateral delimitation element and a second lateral delimitation element, which are assignable to two mutually opposite lateral faces of a stack of products at inner surfaces of the first lateral delimitation element and the second lateral delimitation element;
   wherein the first lateral delimitation element comprises a guide extending along the first lateral delimitation element, the at least one upper holding element being linearly displaceable along said guide, wherein the at least one upper holding element is preloaded to a predetermined position or is freely movable within said guide, and wherein the at least one upper holding element protrudes from said guide towards the second lateral delimitation element;
   wherein the method comprises the steps of:
   a) disposing the stack of products and the gripping unit relative to one another in the receiving region, wherein the stack is formed by a plurality of products lying on top of one another;
   b) receiving the stack disposed in the receiving region by means of the gripping unit;
   c) moving the received stack from the receiving region to the depositing region by means of the gripping unit;
   d) depositing the moved stack in the depositing region;
   e) repeating steps a) to d) for at least one further stack.

14. The method of claim 13, wherein step b) of receiving the stack of products furthermore comprises:
   b1) moving at least one of the first lateral delimitation element and the second lateral delimitation element in the direction of a lateral face of the stack that faces said at least one of the first lateral delimitation element and the second lateral delimitation element; and
   b2) moving at least one of the at least one upper and the lower holding element relative to an upper side or a lower side of the stack that faces said holding element and that extends so as to be perpendicular to the lateral faces of the stack.

15. The method of claim 13, wherein step a) of disposing the gripping unit takes place in such a manner that the two mutually opposite lateral faces of the stack of products are disposed between the first lateral delimitation element and the second lateral delimitation element of the gripping unit, and an upper side and a lower side of the stack are disposed between the at least one upper holding element and the at least one lower holding element of the gripping unit.

16. The method of claim 15, wherein the at least one lower holding element during step a) is situated in a first position in which said lower holding element does not protrude substantially into an intermediate space between the first lateral delimitation element and the second lateral delimitation element; and
   wherein step b) comprises moving the at least one lower holding element from the first position to a second position in which the at least one lower holding element protrudes into the intermediate space between the first lateral delimitation element and the second lateral delimitation element and delimits the intermediate space in a downward manner so as to form a receptacle for the stack.

17. The method of claim 16, wherein step d) of depositing the moved stack furthermore comprises:
   moving the at least one lower holding element from the second position to the first position and, on account thereof, releasing the stack in a downward manner;
   entraining the at least one upper holding element by way of the upper side of the stack during the depositing until the lower side of the stack bears in the depositing region.

18. The method of claim 13, wherein the second delimitation element of the gripping unit used in step a) comprises a further guide extending along the second lateral delimitation element, at least one further upper holding element being linearly displaceable along said further guide and along the second lateral delimitation element, wherein the at least one further upper holding element is preloaded to a predetermined position or is freely movable within said further guide, and wherein the at least one further upper holding element protrudes from said further guide towards the first lateral delimitation element.

* * * * *